United States Patent [19]

Burken et al.

[11] Patent Number: 6,102,330

[45] Date of Patent: Aug. 15, 2000

[54] EMERGENCY MULTIENGINE AIRCRAFT SYSTEM FOR LATERAL CONTROL USING DIFFERENTIAL THRUST CONTROL OF WING ENGINES

[75] Inventors: John J. Burken, Tehachapi; Frank W. Burcham, Jr., Lancaster; John Bull, Los Altos, all of Calif.

[73] Assignee: The United States of America as represented by the Administrator of the National Aeronautics and Space Administration, Washington, D.C.

[21] Appl. No.: 08/905,777

[22] Filed: Jul. 29, 1997

[51] Int. Cl.$^7$ .................................................. B64C 19/00
[52] U.S. Cl. .......................................... 244/76 R; 244/184
[58] Field of Search ................................. 244/76 R, 183, 244/188, 184, 52

[56] References Cited

U.S. PATENT DOCUMENTS

| | | |
|---|---|---|
| 2,798,682 | 7/1957 | Alderson et al. . |
| 3,126,170 | 3/1964 | Dornier ...................................... 244/52 |
| 3,176,463 | 4/1965 | Bauger et al. ............................. 244/52 |
| 3,361,392 | 1/1968 | Doniger et al. . |
| 4,106,730 | 8/1978 | Spitzer et al. . |
| 5,060,889 | 10/1991 | Nadkarni et al. . |
| 5,330,131 | 7/1994 | Burcham et al. . |

OTHER PUBLICATIONS

F.W. Burcham, Jr. & C. Gordon Fullerton, "Controlling Crippled Aircraft–With Throttles," NASA Technical Memorandum 104238, Sep. 1991, pp. 1–26.

Frank W. Burcham, Jr., T.A. Maine, John J. Burken, and Drew Pappas, Development and Flgith Test of an Augmented Thrust–Only Flight Control System on an MD–11 Transport Airplane, Jul. 1996, pp. 1–25, NASA Technical Memorandum 4745.

John Bull et al., Piloted Simulation Tests of Propulsion Control as Backup to Loss of Primary Flight Controls for a Mid–Size Jet Transport, NASA Technical Memorandum 110374, Dec. 1995, pp. 1–35.

Primary Examiner—Peter M. Poon
Assistant Examiner—Tien Dinh
Attorney, Agent, or Firm—John H. Kusmiss

[57] ABSTRACT

An emergency flight control system is disclosed for lateral control using only differential engine thrust modulation of multiengine aircraft having at least two engines laterally displaced to the left and right from the axis of the aircraft in response to a heading angle command $\psi_c$ to be tracked. By continually sensing the heading angle $\psi$ of the aircraft and computing a heading error signal $\psi_e$ as a function of the difference between the heading angle command $\psi_c$ and the sensed heading angle $\psi$, a track control signal is developed with compensation as a function of sensed bank angle $\Phi$, bank angle rate $\phi$, or roll rate p, yaw rate $\tau$, and true velocity to produce an aircraft thrust control signal $ATC_{\psi(L,R)}$. The thrust control signal is differentially applied to the left and right engines with equal amplitude and opposite sign such that a negative sign is applied to the control signal on the side of the aircraft to which a turn is required to reduce the error signal until the heading feedback reduces the error to zero.

4 Claims, 2 Drawing Sheets

EMERGENCY MULTIENGINE AIRCRAFT SYSTEM FOR LATERAL CONTROL USING DIFFERENTIAL THRUST CONTROL OF WING ENGINES

ORIGIN OF INVENTION

The invention disclosed herein was made by two employees of the United States Government, and may therefore be manufactured and used by or for the Government for governmental purposes without the payment of any royalties therefor, in conjunction with an employee of a contractor of the United States Government in which invention the contractor has elected not to seek to retain any title.

1. Technical Field

The invention relates to an emergency flight control system using only autocontrol engine thrust modulation for lateral control of an aircraft in the event of a failure of primary control effectors, namely wing and tail control surfaces.

2. Background Art

In the last score of years, aircraft have experienced major flight control system failures and have had to use engine throttles for emergency flight control after losing the aircraft's hydraulic system.

In the majority of cases a crash resulted, particularly while attempting a landing, claiming many lives. To investigate the technique of engine thrust control over flight, the National Aeronautics and Space Administration, Dryden Flight Research Center, conducted flight and ground simulator experiments and analytical studies to determine the degree of flight control available with pilot manipulation of engine throttles for various classes of multiengine aircraft which have laterally displaced engines from the F15 to the B-747 and including the MD-11 which has a third engine mounted over the fuselage at the base of the tail.

In flight, a research pilot was able to use differential throttle control to generate sideslip which, through the dihedral effect, resulted in a roll and use symmetric throttle control to climb or descend by increasing or decreasing thrust. A research pilot could thus not only successfully fly a simulator but could also put a simulator on the runway for a safe landing. In actual flight, however, both longitudinal and lateral control were almost too difficult for flight and unsafe for landing. It was thus clear that there was a need for a computerized engine-thrust control system to provide an emergency Propulsion Control Aircraft (PCA). The engine-thrust control system for longitudinal flightpath angle control is described in a copending application Ser. No. 08/886,656 filed Jul. 1, 1997; by John J. Burken and Frank W. Burcham, Jr. titled EMERGENCY CONTROL AIRCRAFT SYSTEM USING THRUST MODULATION filed Jun. 30, 1997, which by this reference is hereby incorporated herein. The present invention provides an engine-thrust lateral control system that is independent but for the extent both share the same aircraft dynamics responsive to the PCA control of each.

As disclosed, that PCA system is useful for flightpath angle ($\gamma$) control during all phases of flight, including landing approach to touch down. However, to provide safe landing capability, a separate PCA system is required for heading angle ($\psi$) control using differential engine thrust control. The resulting lateral control may be combined with the PCA longitudinal control, either at the input of a cockpit throttle servo, if one is provided separately for each laterally displaced engine on either side of the aircraft, or on each engine throttle servo at the laterally displaced engines for a change in engine pressure ratio (EPR) at each engine.

An object of this invention is therefore to create a sufficient degree of lateral control through differential thrust modulation of laterally displaced engines, i.e., engines equally spaced on both wings or both sides of the aircraft fuselage to provide directional control of the aircraft independent of longitudinal (flightpath angle) control and, in the case of making a landing approach, to make a safe landing when only engine thrust control is available.

STATEMENT OF THE INVENTION

In accordance with the present invention, lateral control of a multiengine aircraft is provided in response to a heading angle command, $\psi_c$, produced by a pilot through a thumbwheel or by an instrument landing system. That command is compared to a sensed heading, $\psi$, to produce an error signal that corrects the heading sensed after compensation by feedback signals from selected aircraft dynamic sensors to improve dutch-roll damping and closed loop performance. The compensated error signal is thus transformed into a thrust command $ATC_{\psi(L,R)}$ that is applied to the aircraft engines differentially, i.e., with a positive sign on the left engine(s) and a negative sign on the right engine(s) or vice versa depending on the direction of the heading correction needed to track the command heading $\psi_c$. Bank angle rate $\phi$ is included as a feedback for the dutch-roll damping. Yaw rate $\tau$, bank angle $\Phi$ and true velocity vt are included as feedback signals for efficient turn coordination and smooth change in heading.

In a first embodiment, the EPR autotrim of the digital engine control (DEC) at each engine is used with its limitation of ±5% EPR control, and in order to obviate the need to make changes there, a ±5° limiter is imposed on the error signal ($\psi_c=\psi$) before compensation for any of the bank angle rate $\phi$, yaw rate $\tau$, true velocity vt, and bank angle $\Phi$.

In a second embodiment, the normal autotrim of the DEC may also be used with the ±5% limited autotrim feature but without a 5° limit on heading change. All of the compensation present in the first embodiment for yaw rate $\tau$, bank angle rate $\phi$, and bank angle $\Phi$ are retained in a similar manner for an efficient turn coordination and smooth change in heading with three differences. The three differences in the second embodiment are: first the bandwidth filter is made broader by the $\omega$ selected to accommodate frequency of the yaw rate $\tau$; second the scaling of the track command $T_c$ is made variable by a pilot selected input, Krollmode, for a four engine aircraft, such as a B-747 depending upon whether only two inboard engines, only two outboard engines or all engines are used, namely 2.20 for only inboard engines, 0.65 for all four engines, and 1.40 for only outboard engines; and third the scaling factor $K_{lat}$ which corresponds to the same $K_{lat}$ of the first embodiment is now modified by the variable vt/g in order for the entire lateral control system to be a function of true velocity for more gentle, smoother turns of a four-engine aircraft. The last two features may also be used in the first embodiment.

The novel features that are considered characteristic of this invention are set forth with particularity in the appended claims. The invention will best be understood from the following description when read in connection with the accompanying drawings.

DETAILED DESCRIPTION OF THE INVENTION

The vehicle for which the first embodiment of this invention is designed is the same MD-11 wide-body transport referred to in the aforesaid copending application which has a mechanical flight control system with hydraulically powered actuators of flight control surfaces and is equipped with a Flight Control Computer (FCC) that provides a Flight Management System (FMS) with autopilot, navigation and autoland functions. The autopilot function includes a thumbwheel for commanding not only flightpath angle, γ, but also heading angle, $\psi_c$, during all flight phases, namely climbing, cruising, and descending unless such commands are otherwise being provided from another source, such as from the FMS during an autoland function that relies on an Instrument Landing System (ILS) for guidance control using flightpath angle (γ) and heading (ψ) commands.

In the MD-11 airplane, two engines are mounted in underwing pods equally spaced on each side with the third engine centered at the base of the vertical stabilizer. While all three engines are controlled together by the PCA system for longitudinal control through a cockpit autothrottle servo, for lateral control the wing engines are controlled differentially through separate and direct engine thrust or engine pressure ratio (EPR) control in order to provide lateral control in response to a heading angle command, $\psi_c$. Consequently, the lateral control system of the present invention produces two separate engine thrust modulation signals $ATC_\psi$ to be applied directly to respective engines differentially to modulate the longitudinal control effected at the engines by the longitudinal thrust control signals $ATC_\gamma$ sent to all engines through the cockpit throttle servo (as shown in the aforesaid copending application) thereby producing the desired effect of differential lateral control signals $ATC_\psi$ (L,R) at the left and right wing engines, i.e., producing the effect of $ATC_\gamma \pm ATC_\psi$ (L,R) for the left and right wing engines as though $ATC_\gamma \pm ATC_{\psi(L,R)}$ were formed at cockpit thrust servos using separate cockpit autothrottle servos for the wing engines. Because the MD-11 is equipped with only one cockpit thrust servo responsive to $ATC_\gamma$, the control signal $ATC_{\psi(L,R)}$ must be sent directly to the engines to differentially modulate the engine pressure ratio (EPR) setting at the left and right wing engines or otherwise modulate the engine thrusts.

Figure 1:
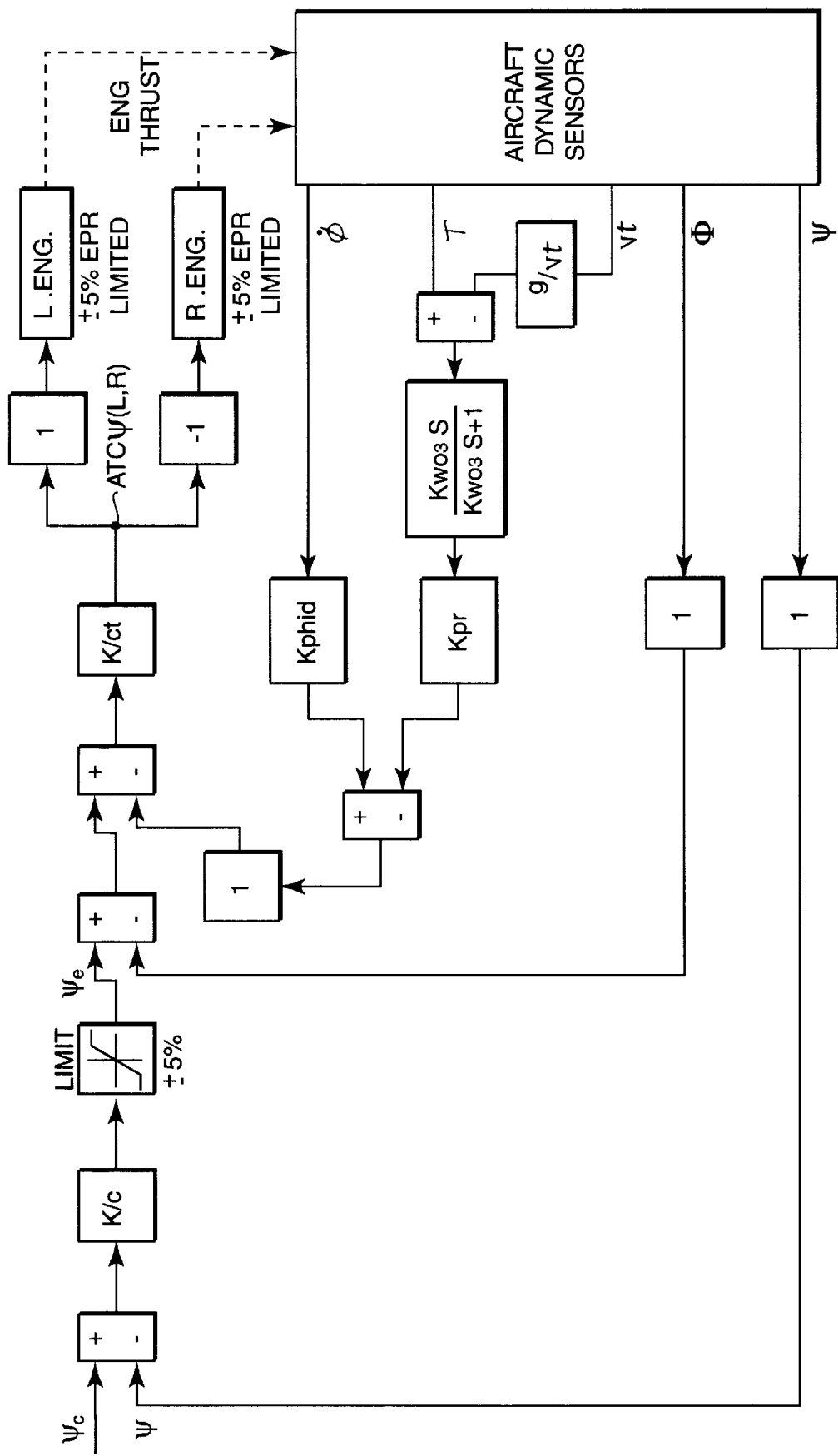
FIG. 1 is a functional block diagram of a PCA system for lateral-directional control, i.e., for tracking a heading command signal $\psi_c$ in a multiengine aircraft on which all engines have engine controllers with a normal ±5% engine pressure ratio (EPR) command limitation.

The block diagram of the lateral control law shown in FIG. 1 assumes the case of the lateral thrust control signal $ATC_{\psi(L,R)}$ applied differentially and directly to the digital engine control (DEC) of each engine. In this case, the DEC of each engine is unmodified so that it may accept only normal EPR commands with a ±5% limit. After comparing a sensed aircraft heading angle ψ in degrees with a pilot or other control input heading angle $\psi_c$ and scaling the resulting error signal by a constant $K_{1c}$, the scaled error signal is passed through a ±5° error limiter and compared to a sensed bank angle, Φ, from aircraft dynamic sensors. The resulting error signal $\psi_e$ is then further modified as a function of the difference of τ and g≈32.2 divided by true velocity vt in order to provide τ-g/vt. The result (τ-g/vt) is then passed through a bandpass filter $K_{wo3}S/(K_{wo3}+1)$, where $K_{wo3}$ is a wash-out time constant that effectively controls the bandpass of the filter. The filtered output, scaled by a constant $K_{pτ}$, is added to the sensed bank angle rate φ after that angle rate is scaled by a constant $K_{phid}$. The feedback signal thus developed is subtracted from the heading error $\psi_e$ compensated by the bank angle Φ to further compensate for the bank angle rate φ, the yaw rate τ and g/vt. The fully compensated thrust command signal $T_c$ is then scaled by a constant $K_{lat}$ to produce the $ATC_{\psi(L,R)}$ signal applied differentially to left and right engines. The functional blocks representing gains of 1 and −1 provide the differential thrist signals applied to the engines. If $ATC_{\psi(L,R)}$ is positive, the right engine receives a negative control signal while the left engine receives a positive control signal for a right turn and vice versa if $ATC_{\psi(L,R)}$ is negative.

The control law for tracking a command heading angle $\psi_c$ is as follows:

$$ATC_{\psi(L,R)} = \left\{[(\psi_c - \psi)*K_{1c} - \Phi] - \dot{\phi}*K_{phid} + K_{pτ}*\left(\frac{K_{wo3}S}{K_{wo3}S+1}\right)*\left(\tau - \frac{g}{vt}\right)\right\}*K_{lat} \quad (1)$$

Implementation of this control law is preferably in a programmed digital computer. The constants $K_{ic}$, $K_{lat}$, $K_{phid}$ and $K_{pr}$ are scaling constants initially determined by aircraft aerodynamic analysis and then optimized empirically, vt is true velocity, which is sensed velocity adjusted for altitude pressure and temperature, and $K_{wo3}$ is a washout time constant.

As noted above, the output control signal $ATC_{\psi(L,R)}$ is separated into left and right engine commands by the signs of the gain (+1 and −1) of functional blocks. The ±5°% limiter on the error signal $\psi_e$ provides the necessary limit on the product of $\psi_e$ and $K_{ic}$ which, in conjunction with the other scaling constants, will limit the engine thrust control called for in response to the command $ATC_{\psi(L,R)}$ to be within the EPR range of ±5%.

The differential lateral control effect thus produced is used to generate yaw of the airplane, resulting in roll caused by the dihedral angle of the airplane wings in order to bank the airplane for a turn while tracking a heading angle command $\psi_c$. The differential lateral control law uses feedback signals developed from selected aircraft dynamic sensors to improve closed loop performance. Bank angle rate φ is included for dutch-roll damping. Yaw rate τ, bank angle Φ, and vt are included for efficient turn coordination and smooth change in heading angle.

Figure 2:
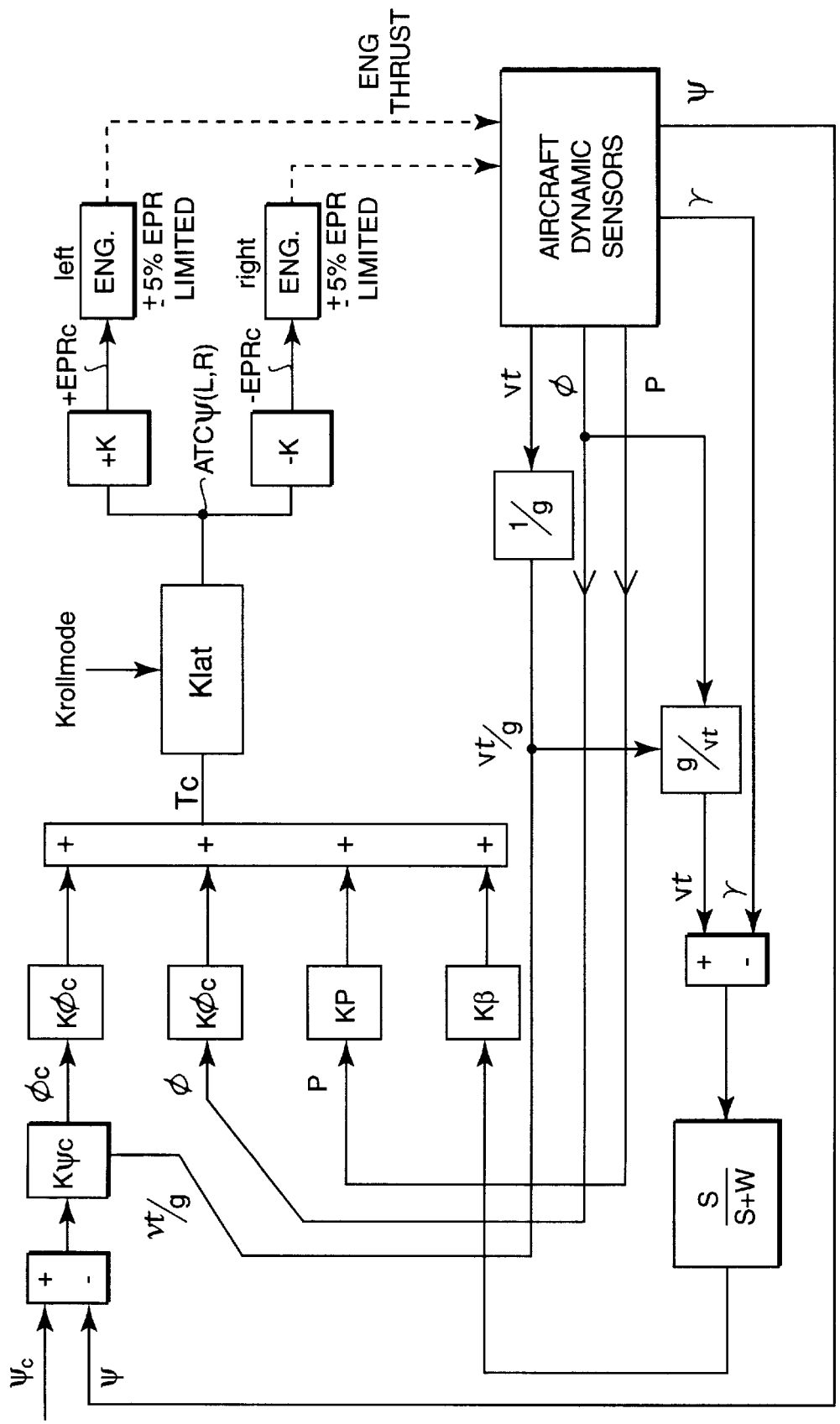
FIG. 2 is a functional block diagram of a PCA system for lateral-directional control similar to that in FIG. 1 but with all engines modified to have engine controllers with full-authority EPR command (FACED).

Referring now to FIG. 2, a block diagram is shown of a second embodiment for lateral control of an aircraft with multiengines, each engine having its separate digital engine control (DEC) computer with its ±5% EPR feature. The lateral control law for this embodiment is as follows:

$$Tc = K_{\phi ref} * K_{rollmode} * [(K_{\phi_c} * \phi_c - K_\phi * \phi) - K_p * \rho - \beta_{star}] \quad (2)$$

$$\beta_{star} = K_\beta * \left(\frac{S}{S+\omega}\right) * g * \frac{\phi}{vt} - \tau, \quad (3)$$

$$\theta_c = K_{\psi c} * (vt/g)(\psi_c - \psi), \quad (4)$$

where:

φ is roll attitude, deg, $\psi_c$ is commanded track angle, deg, $\psi$ is the sensed heading, deg, $\tau$ is sensed yaw rate, deg/sec, $\omega$ is selected to set band of highpass filter, P is roll rate, deg/sec, K's are scaling constants, $EPR_c = \pm K_{eng} * Tc$, $K_{eng}$ is a scaling factor for the particular engine, vt is true velocity $K_{rollmode}$ = 0.65 for a four engine configuration of a B-747 airplane having two on each wing, = 2.20 for inboard engines only = 1.40 for outboard engines only.

Note: For an MD-11, the $K_{lat}$ is on the same order as that for the B-747 inboard engines only. All other constants for the B-747, as for the MD-11, are determined by aerodynamic analysis for the particular aircraft and empirically optimized for performance.

Although particular embodiments of the invention have been described and illustrated herein, it is recognized that modifications may readily occur to those skilled in the art. For example, in both embodiments, the digital engine control for each engine may be modified to eliminate the ±5% EPR limitation. Both embodiments were designed to work with that feature because most jet aircraft engines are provided with an EPR autotrim feature with that limitation, but both are capable of working with engines that do not have that limitation. Consequently, it is intended that the claims be interpreted to cover such modifications and equivalents thereof.

What is claimed is:

1. An emergency flight control system for heading angle $\psi$ of a multiengine aircraft using engine thrust modulation for differential lateral control of said multiengine aircraft having at least two engines laterally displaced from a longitudinal axis thereof comprising, means for independently entering a heading angle command $\psi_c$ to be tracked by said aircraft, means for continually sensing said heading angle $\psi$ of said aircraft, means for computing a heading error signal $\psi_e$ as a function of the difference between said heading angle command $\psi_c$ and said sensed heading angle $\psi$, means for compensating said error signal $\psi_e$ as a function of sensed bank angle rate $\phi$ for dutch roll damping and of sensed bank angle $\Phi$, yaw rate $\tau$ and velocity for efficient turn coordination to produce an aircraft thrust control signal $ATC_{\psi(L,R)}$, and means for differentially applying said aircraft thrust control signal to said left and right engines with equal amplitude and opposite sign with the negative sign applied to the control signal on the side of the aircraft to which a turn is required to reduce said error signal toward zero.

2. An emergency flight control system as defined in claim 1 wherein said means for compensating said error signal $\psi_e$ is implemented in accordance with the following control law:

$$ATC_{\psi(L,R)} = \left\{[(\psi_c - \psi) * K_{1c} - \Phi] - \dot{\phi} * K_{phid} + K_{p\tau} * \left(\frac{K_{wO3}S}{K_{wO3}S + 1}\right) * \left(\tau - \frac{g}{vt}\right)\right\} * K_{lat}$$

where: $K_{ic}$, $K_{lat}$, $K_{phid}$ and $K_{p\tau}$ are scaling constants initially determined by aircraft aerodynamic analysis and then optimized empirically, vt is true velocity, which is sensed velocity adjusted for altitude pressure and temperature, and $K_{wO3}$ is a washout time constant.

3. An emergency flight control system as defined in claim 1 here said means for compensating said error signal $\psi_e$ is implemented in accordance with the following control law:

$$Tc = K_{\phi ref} * K_{rollmode} * [(K_{\phi_c} * \phi_c - K_\phi * \phi) - K_p * p - \beta_{star}]$$

$$\beta_{star} = K_\beta * \left(\frac{S}{S + \omega}\right) * g * \frac{\phi}{vt} - \tau,$$

$$\theta_c = K_{\psi c} * (vt/g)(\psi_c - \psi),$$

where:

$\phi$ is roll attitude, deg, $\psi$ is commanded track angle, deg, $\psi$ is the sensed heading, deg, $\tau$ is sensed yaw rate, deg/sec, $\omega$ is selected to set band of highpass filter, p is roll rate, deg/sec, K's are scaling constants, $EPR_c = K_{eng} * Tc$, $K_{eng}$ is a scaling factor for the particular engine, vt is true velocity.

$K_{rollmode}$ = 0.65 for a four engine configuration of a B-747 airplane having two on each wing,

= 2.20 for inboard engines only,

= 1.40 for outboard engines only.

4. An emergency flight control system using engine thrust modulation for heading angle $\psi$ control of a multiengine aircraft with differential of at least two engines laterally displaced from a longitudinal axis thereof comprising, means for independently entering a heading angle command $\psi_c$ to be tracked by said aircraft, means for continually sensing said heading angle $\psi$ of said aircraft, means for computing a heading error signal $\psi_e$ as a function of the difference between said heading angle command $\psi_c$ and said sensed heading angle $\psi$, means for compensating said error signal $\psi_e$ as a function of sensed roll attitude $\phi$ for dutch roll damping and of sensed bank angle $\Phi$, roll rate $\rho$, yaw rate $\tau$ and velocity to produce an aircraft thrust control signal $ATC_{\psi(L,R)}$, and means for differentially applying said aircraft thrust control signal to said left and right engines with equal amplitude and opposite sign with the negative sign applied to the control signal on the side of the aircraft to which a turn is required to reduce said error signal toward zero.

* * * * *